(12) United States Patent
Zhang et al.

(10) Patent No.: US 12,425,281 B2
(45) Date of Patent: Sep. 23, 2025

(54) CONFIGURATION OF RANDOM ACCESS PREAMBLE

(71) Applicant: ZTE Corporation, Guangdong (CN)

(72) Inventors: Chenchen Zhang, Guangdong (CN); Nan Zhang, Guangdong (CN); Wei Cao, Guangdong (CN); Fangyu Cui, Guangdong (CN); Kaibo Tian, Guangdong (CN)

(73) Assignee: ZTE Corporation, Guangdong (CN)

( * ) Notice: Subject to any disclaimer, the term of this patent is extended or adjusted under 35 U.S.C. 154(b) by 403 days.

(21) Appl. No.: 17/851,770

(22) Filed: Jun. 28, 2022

(65) Prior Publication Data

US 2022/0337464 A1   Oct. 20, 2022

Related U.S. Application Data

(63) Continuation of application No. PCT/CN2020/093382, filed on May 29, 2020.

(51) Int. Cl.
*H04W 72/00* (2023.01)
*H04J 13/00* (2011.01)
*H04L 27/26* (2006.01)
*H04W 74/0833* (2024.01)

(52) U.S. Cl.
CPC .... *H04L 27/26025* (2021.01); *H04J 13/0062* (2013.01); *H04L 27/2605* (2013.01); *H04W 74/0833* (2013.01)

(58) Field of Classification Search
CPC ........ H04L 27/26025; H04W 74/0833; H04W 56/0035
See application file for complete search history.

(56) References Cited

U.S. PATENT DOCUMENTS

| | | | |
|---|---|---|---|
| 2017/0223743 A1* | 8/2017 | Lin | H04L 5/0012 |
| 2019/0037605 A1 | 1/2019 | Agiwal et al. | |
| 2019/0059085 A1* | 2/2019 | Sun | H04L 5/0053 |
| 2020/0245363 A1* | 7/2020 | Kim | H04L 5/0012 |
| 2020/0245365 A1* | 7/2020 | Lin | H04L 5/0053 |

FOREIGN PATENT DOCUMENTS

| | | | | |
|---|---|---|---|---|
| CN | 110234151 A | 9/2019 | | |
| EP | 3 550 922 A1 | 10/2019 | | |
| EP | 3668251 A1 * | 6/2020 | | H04B 1/713 |
| WO | WO 2019/031864 A1 | 2/2019 | | |
| WO | WO 2019/066705 A1 | 4/2019 | | |

OTHER PUBLICATIONS

Extended European Search Report recevied for Application No. EP 20896047.6 mailed Oct. 21, 2022 (9 pages).

(Continued)

*Primary Examiner* — Pamit Kaur
(74) *Attorney, Agent, or Firm* — Crowell & Moring LLP (57) ABSTRACT

A wireless communication method for use in a wireless terminal is disclosed. The wireless communication method comprises transmitting, to a wireless network node, a random access preamble selected from a plurality of predetermined preambles for a random access.

13 Claims, 8 Drawing Sheets

(56) References Cited

OTHER PUBLICATIONS

International Search Report and Written Opinion received for Application No. PCT/CN2020/093382 mailed Feb. 25, 2021 (6 pages).
LG Electronics. "Discussion on Channel Structure for 2-step RACH" *3GPP TSG RAN WG1 Meeting #99 R1-1912262*, Nov. 22, 2019 (16 pages).
Intel Corporation. "Design of NPRACH for TDD support in feNB-IoT" *3GPP TSG RAN WG1 Meeting #90 R1-1714122*, Aug. 25, 2017 (3 pages).
Office Action issued for China Patent Application No. 202080100483.6 dated Nov. 13, 2024 (with translation) (19 pp.).
Extended European Search Report received for Application No. EP 20896047.6 mailed Oct. 21, 2022 (9 pages).
Li Zhen et al., "Preamble Design and Detection for 5G Enabled Satellite Random Access," IEEE Access, vol. 8, Mar. 10, 2020, pp. 49873-49884, XP011778919 (12 pp.).
Li Zhen et al., "Random Access Preamble Design and Detection for Mobile Satellite Communication Systems," IEEE Journal on Selected Areas in Communications, vol. 36, No. 2, Feb. 1, 2018, pp. 280-291, XP055872810 (12 pp.).
Office Action issued for China Patent Application No. 202080100483.6 dated Mar. 22, 2025 (with English translation) (17 pp.).

\* cited by examiner

CONFIGURATION OF RANDOM ACCESS PREAMBLE

PRIORITY

This application claims priority as a Continuation of PCT/CN2020/093382, filed on May 29, 2020, entitled "CONFIGURATION OF RANDOM ACCESS PREAMBLE", published as WO 2021/109502 A1, the entirety of which is incorporated herein by reference.

TECHNICAL FIELD

This document is generally related to wireless communications.

BACKGROUND

Under certain situations, internet-of-thing (IoT) devices may be distributed in remote areas. In these situations, it is challenging to provide a ubiquitous coverage for IoT services. In order to ensure the ubiquitous coverage and the service continuity, narrowband IoT (NB-IoT) over low-Earth-orbit (LEO) satellite becomes an attractive architecture. However, LEO channel may go along with large Doppler shifts and long round-trip time (RTT) which would has a significant impact on the random access process (e.g. physical random access channel (PRACH) process) in the NB-IoT. Thus, how to design the PRACH to support initial access of the IoT devices served by the LEO satellite becomes a topic to be discussed.

SUMMARY

This document relates to methods, systems, and devices for configuring random access preambles, and more particularly to methods, systems, and devices for configuring random access preambles in the NB-IoT.

In particular, the present disclosure relates to a wireless communication method for use in a wireless terminal. The wireless communication method comprises transmitting, to a wireless network node, a random access preamble selected from a plurality of predetermined preambles for a random access.

Various embodiments may implement the following features:

In some embodiments, the plurality of predetermined preambles is determined by disabling at least one symbol group of a plurality of reference preambles.

In some embodiments, the plurality of predetermined preambles has a hopping between symbol groups for each of the plurality of predetermined preambles and the hopping is greater than 1 subcarrier spacing.

In some embodiments, the hopping is 6 subcarrier spacings.

In some embodiments, a length of a cyclic prefix in the plurality of predetermined preambles is adjusted based on the maximum time offset related to the wireless terminal.

In some embodiments, a subcarrier spacing of the plurality of predetermined preambles is greater than twice the maximum frequency offset.

In some embodiments, a subcarrier spacing of the plurality of predetermined preambles is smaller than a reciprocal of the maximum time offset.

In some embodiments, a subcarrier spacing of the plurality of predetermined preambles is adjusted by at least one scaling factor.

In some embodiments, the subcarrier spacing of the plurality of predetermined preambles is adjusted by different scaling factors in different frames.

In some embodiments, the plurality of predetermined preambles is determined by disabling at least one resource occasion in a plurality of reference preambles.

In some embodiments, the plurality of predetermined preambles has resource occasion gaps between every two symbol groups contiguous in frequency domain.

In some embodiments, the resource occasion gaps have different numbers of subcarrier spacings.

In some embodiments, symbols in each symbol group for the plurality of predetermined preambles form one of a Zadoff-Chu sequence or a pseudo-noise sequence.

In some embodiments, a cyclic prefix in the plurality of predetermined preambles comprises at least one symbol in a tail of a symbol group of the cyclic prefix.

In some embodiments, the wireless communication method further comprises receiving, from the wireless network node, a configuration associated to the plurality of predetermined preambles.

In some embodiments, the configuration comprises at least one of disabling information for disabling at least one symbol group or at least one resource occasion of a plurality of reference preambles, a subcarrier spacing of the plurality of predetermined preambles, at least one scaling factor for adjusting the subcarrier spacing of the plurality of predetermined preambles, or a sequence of the at least one scaling factor.

The present disclosure relates to a wireless communication method for use in a wireless network node. The wireless communication method comprises receiving, from a wireless terminal, a random access preamble selected from a plurality of predetermined preambles for a random access.

Various embodiments may implement the following features:

In some embodiments, the plurality of predetermined preambles is determined by disabling at least one symbol group of a plurality of reference preambles.

In some embodiments, the plurality of predetermined preambles has a hopping between symbol groups for each of the plurality of predetermined preambles and the hopping is greater than 1 subcarrier spacing.

In some embodiments, the hopping is 6 subcarrier spacings.

In some embodiments, a length of a cyclic prefix in the plurality of predetermined preambles is adjusted based on the maximum time offset related to the wireless terminal.

In some embodiments, a subcarrier spacing of the plurality of predetermined preambles is greater than twice the maximum frequency offset.

In some embodiments, a subcarrier spacing of the plurality of predetermined preambles is smaller than a reciprocal of the maximum time offset.

In some embodiments, a subcarrier spacing of the plurality of predetermined preambles is adjusted by at least one scaling factor.

In some embodiments, the subcarrier spacing of the plurality of predetermined preambles is adjusted by different scaling factors in different frames.

In some embodiments, the plurality of predetermined preambles is acquired by disabling at least one resource occasion in a plurality of reference preambles.

In some embodiments, the plurality of predetermined preambles has resource occasion gaps between every two symbol groups contiguous in frequency domain.

In some embodiments, the resource occasion gaps have different numbers of subcarrier spacings.

In some embodiments, symbols in each symbol group for the plurality of predetermined preambles form one of a Zadoff-Chu sequence or a pseudo-noise sequence.

In some embodiments, a cyclic prefix in the plurality of predetermined preambles comprises at least one symbol in a tail of a symbol group of the cyclic prefix.

In some embodiments, the wireless communication method further comprises transmitting, to the wireless terminal, a configuration associated to the plurality of predetermined preambles.

In some embodiments, the configuration comprises at least one of disabling information for disabling at least one symbol group or at least one resource occasion of a plurality of reference preambles, a subcarrier spacing of the plurality of predetermined preambles, at least one scaling factor for adjusting the subcarrier spacing of the plurality of predetermined preambles, or a sequence of the at least one scaling factor.

The present disclosure relates to a wireless terminal comprising a communication unit, configured to transmit, to a wireless network node, a random access preamble selected from a plurality of predetermined preambles for a random access.

Various embodiments may implement the following feature:

In some embodiments, the wireless terminal further comprises a processor configured to perform a wireless communication method of any of the foregoing described methods.

The present disclosure relates to a wireless network node, comprising a communication unit, configured to receive, from a wireless terminal, a random access preamble selected from a plurality of predetermined preambles for a random access.

Various embodiments may implement the following feature:

In some embodiments, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of the forgoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
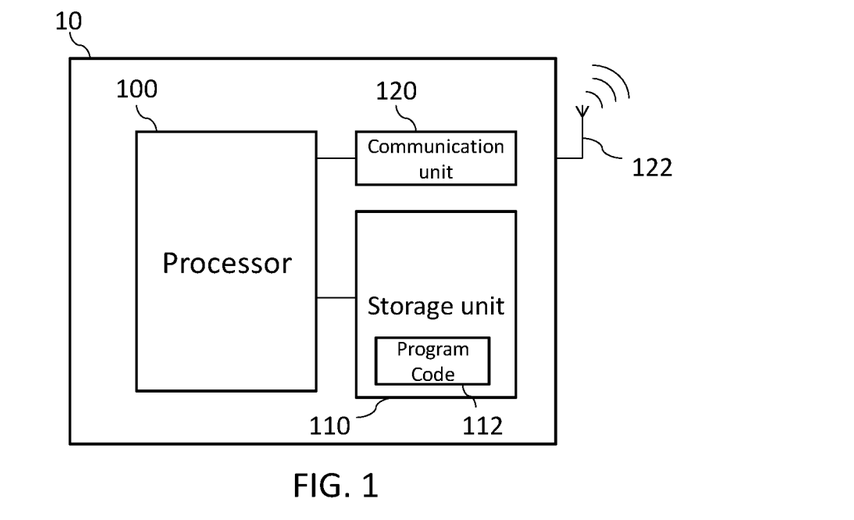
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 112 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
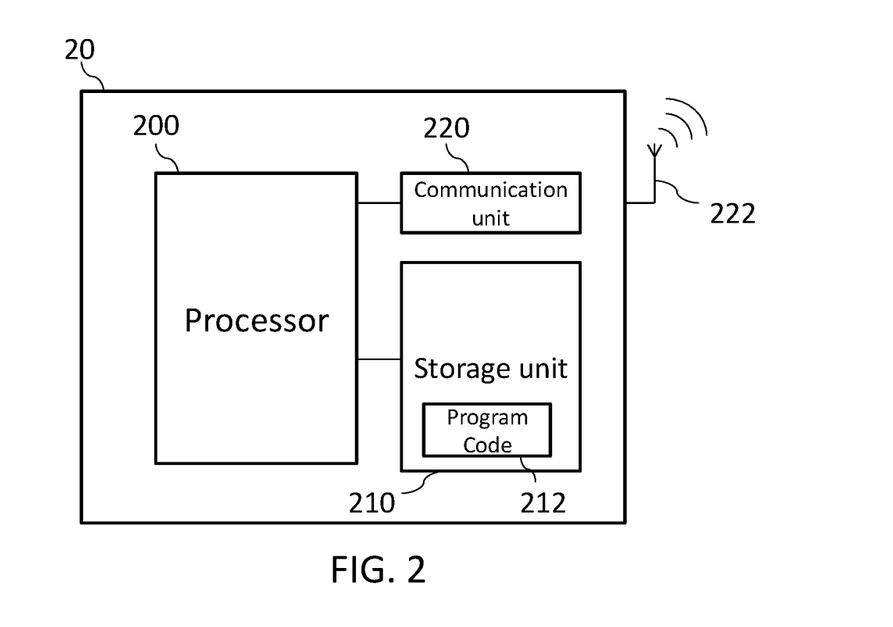
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. UE).

In present disclosure, the preamble may be a physical random access channel (PRACH) preamble, a random access preamble, a random access channel (RACH) preamble or a preamble used for random access (procedure).

In an embodiment, the random access preamble (e.g. PRACH preamble) is used in wireless communications to fulfill uplink (UL) synchronization in initialization of access. In the NB-IoT, the signal of each UE is concentrated on a narrow band of 180 KHz. In addition, the PRACH preamble is transmitted in a single subcarrier and hops within the narrow band.

Figure 3:
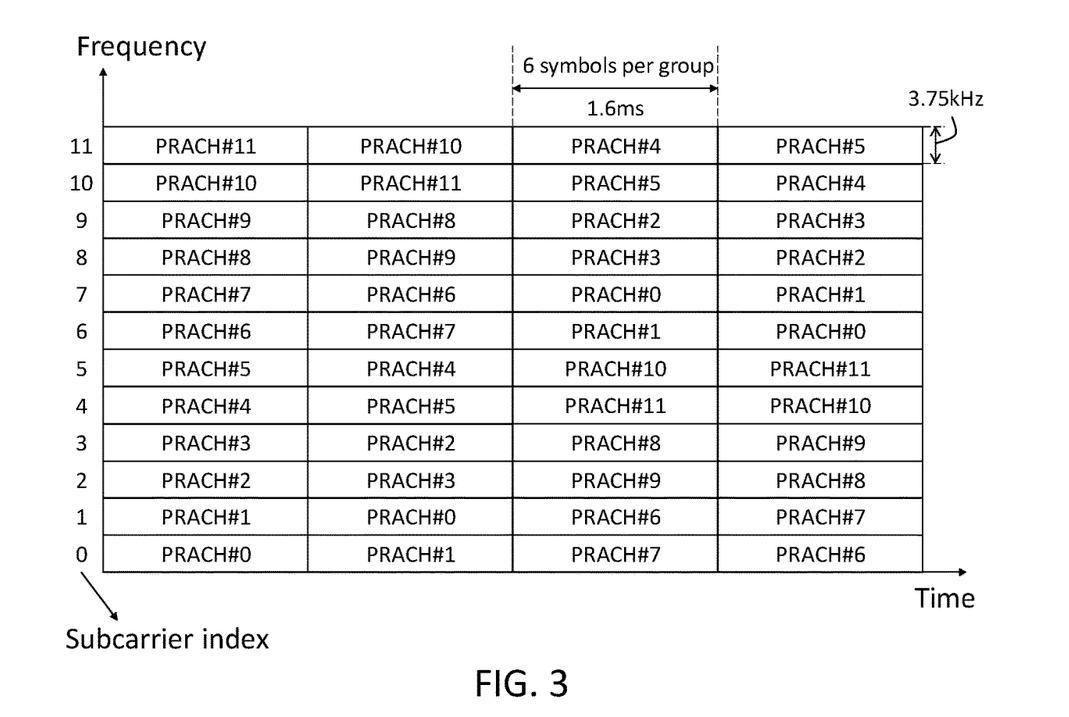
FIG. 3 shows a schematic diagram of preambles according to an embodiment of the present disclosure.

In an embodiment, a symbol group is the concatenation of a cyclic prefix and several identical orthogonal frequency-division multiplexing (OFDM) symbols. For example, each of the OFDM symbols only occupies one subcarrier and has value "1" in the frequency domain. The PRACH preamble in the NB-IoT consists of several symbol groups (e.g.

repetition units) with frequency hopping. FIG. 3 shows a schematic diagram of predetermined PRACH preambles PRACH #0 to PRACH #11. Note that FIG. 3 illustrates timing and frequency relationships among the PRACH #0 to PRACH #11 and does not limit actual timing and/or frequency of each preamble. As shown in FIG. 3, each of PRACH #0 to PRACH #11 locates in a PRACH occasion of each subcarrier and hopping of each of PRACH #0 to PRACH #11 is determined by the frequency location of the corresponding first symbol group. In addition, the symbol groups shown in FIG. 3 comprises 6 symbols (e.g. a cyclic prefix and 5 OFDM symbols with the value "1"). In an initialization process, a UE chooses (e.g. selects) one PRACH occasion and sends the corresponding random access preamble. The BS is able to identify the UE according to the position of the PRACH occasions in which the random access preamble located. In FIG. 3, the subcarrier spacing (SCS) is 3.75 KHz and the hopping between symbol groups of each of PRACH #0 to PRACH #11 is single SCS or 6 SCSs. In an embodiment, the SCS may be 1.25 KHz.

In a LEO scenario, the Doppler shift and the RTT of the channel become larger than those in a terrestrial network scenario because of high velocity and altitude of the satellites. Even after compensations of common Doppler shift and the RTT for each beam, the residual time offset (TO) and frequency offset (FO) may be still larger than a symbol length and the SCS, respectively. In an embodiment, the residual TO and FO may be further compensated based on the UE position and the ephemeris if the UE has global navigation satellite system (GNSS) capability. However, the TO and FO may remain large when the position estimation is inaccurate or when the UE cannot compensate the residual TO and FO.

According to the accuracy of the GNSS estimation and the compensation ability of the UE, the residual TO and FO can be divided into four situations as illustrated in the following.

(1) Small TO and Small FO

In an embodiment, the UE is able to get accurate estimation for its own position and the satellite's position and the residual TO and FO after compensation are small. In such a condition, a cyclic prefix (CP) of the symbol group in the PRACH preamble may be designed to be shorter. For example, the CP length may be determined (e.g. adjusted or reduced) according to the maximum (e.g. maximal) residual TO. In addition, the small frequency hopping (e.g. hopping with 1 SCS) may be unnecessary. In an embodiment, the hopping between symbol groups of the PRACH preambles is enhanced by designing a new hopping pattern for repetition units of the PRACH preambles or by disabling certain symbol groups in reference preambles (e.g. the preambles of existing PRACH preamble formats). For example, the new hopping pattern may only contain hopping larger than one SCS. In an embodiment, the hopping may be 6 SCSs. As an alternative or in addition, the PRACH preamble configured to the UE may be determined by disabling the symbol groups which are corresponding to the reference preambles and have 1 SCS hopping.

(2) Small TO and Large FO

In an embodiment, the UE may have small residual TO and large residual FO because of the error in GNSS and/or because the UE is not able to perform frequency compensation. In the NB-IoT, 12 or 36 consecutive subcarriers are used for PRACH and each subcarrier can be regarded as one resource occasion (e.g. RACH occasion (RO)). When the FO is larger than one half of the SCS, the BS cannot determine the correct RO corresponding to the preamble. In order to overcome the large FO (e.g. the FO greater than half of the SCS), the SCS may be enlarged. In an embodiment, the SCS is determined (e.g. enlarged, adjusted) by a scaling factor chosen (e.g. configured) by the BS. In an embodiment, the SCS is determined (e.g. enlarged, adjusted) by a list of scaling factors chosen (e.g. configured) by the BS. In an embodiment with the large FO, certain ROs may be disabled for the PRACH preambles. For example, certain ROs may be removed for inserting RO gaps between every two symbol groups for different PRACH preambles. In an embodiment, in order to avoid collisions, the symbols in each symbol group may have different values for enlarging the size of the preamble pool (i.e. increasing preamble capacity). For example, the symbols in each symbol group may form a Zadoff-Chu sequence or a pseudo-noise sequence. In an embodiment, the CP length may also be reduced (e.g. adjusted) according to the maximum residual TO.

(3) Large TO and Small FO

In an embodiment with large TO and small FO, a product of the residual TO and FO may be smaller than 0.5 (i.e. TO*FO<0.5). In this embodiment, the SCS may be reduced to compensate the large TO. As an alternative or in addition, the large TO may be covered by setting different values for the symbols in each symbol group. Furthermore, the CP length may be extended to be up to the whole symbol group, to overcome the large TO.

(4) Large TO and Large FO

In an embodiment, when the UE does not have the GNSS capability, both the residual TO and FO may be large. As discussed in the situations (2) and (3), the large TO and large FO may be compensated by setting different values to the symbols in each symbol group and/or inserting RO gaps between the symbol groups for different PRACH preambles.

The following embodiments provide more details of configuration(s) and/or format(s) proposed in the present disclosure. Note that the person skilled in the art should acknowledge that the embodiments disclosed in the present disclosure may be implemented individually or in any possible combination.

Embodiment 1

In this embodiment, a new hopping pattern is disclosed, e.g., for a scenario with small TO and small FO. In the scenario of small TO, the small hopping (e.g. hopping with one SCS) may be unnecessary. Thus, the new hopping pattern for the repetition unit of each of preambles may be redefined. In an embodiment where the frame structure type is 1, which refers to the hopping pattern of preamble formats 0 and 1 in the NB-IoT, a frequency position $\tilde{n}_{sc}^{RA}(i)$ of the i-th symbol group may be described by:

$$\tilde{n}_{sc}^{RA}(i) = \begin{cases} \tilde{n}_{sc}^{RA}(i-1) + 6, \ i \bmod 4 \neq 0 \text{ and } \tilde{n}_{sc}^{RA}(i-1) < 6 \\ \tilde{n}_{sc}^{RA}(i-1) - 6, \ i \bmod 4 \neq 0 \text{ and } \tilde{n}_{sc}^{RA}(i-1) > 6 \end{cases}$$

When $i \bmod 4=0$, $\tilde{n}_{sc}^{RA}(i)$ is all the same with the NB-IoT preamble.

Figure 4:
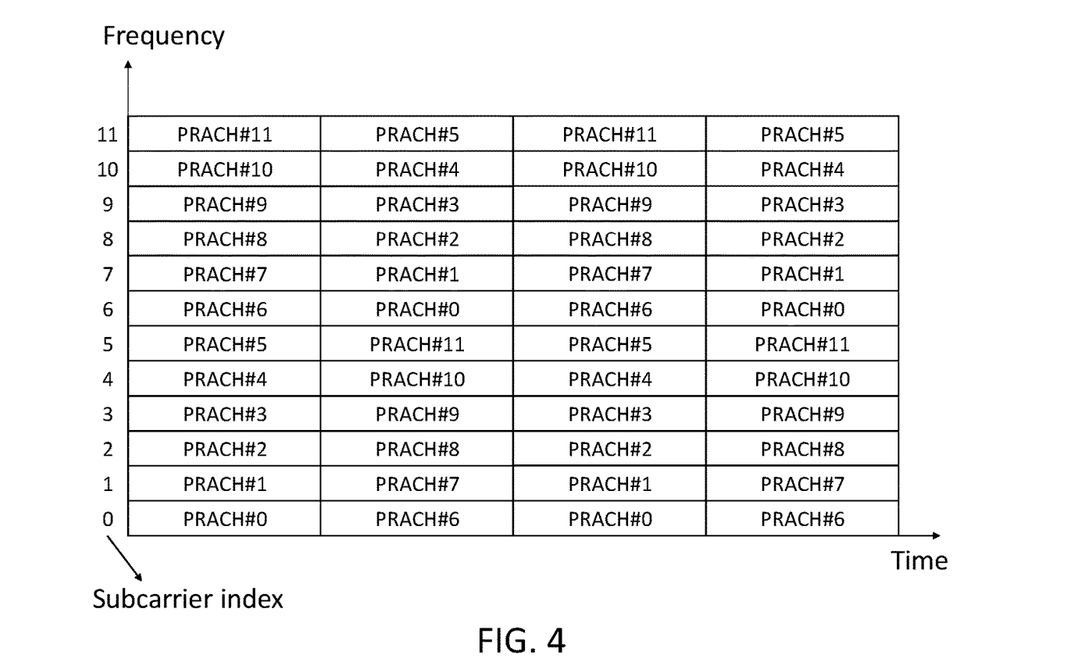
FIG. 4 shows a schematic diagram of preambles according to an embodiment of the present disclosure.

FIG. 4 shows a schematic diagram of preambles PRACH #0 to PRACH #11 according to an embodiment of the present disclosure. In FIG. 4, each symbol group consists of 5 symbols and one CP. In an embodiment, the length of CP is the same as the maximal TO. In addition, each of PRACH #0 to PRACH #11 is the concatenation of several repetition units. For each repetition unit, the frequency position of the first symbol group is randomly generated. As shown in FIG. 4, the (frequency) hopping between symbol groups in the repetition units for each of PRACH #0 to PRACH #11 is 6 SCSs.

Embodiment 2

In this embodiment, a new hopping pattern is disclosed, e.g., for a scenario with small TO and small FO. In addition, the new hopping pattern is determined (e.g. acquired or obtained) based on a hopping pattern of reference preambles. For example, the reference preambles may be preambles of existing preamble formats in the NB-IoT. In an embodiment, the hopping pattern of the reference preamble may be expressed by:

$$\tilde{n}_{sc}^{RA}(i) = \begin{cases} \left(\tilde{n}_{sc}^{RA}(0) + f(i/4)\right) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

where $\tilde{n}_{sc}^{RA}(i)$ is the frequency position of the i-th symbol group.

In an embodiment, the new hopping pattern may be determined, e.g., by disabling some components of the reference preambles. For example, the new hopping pattern may be constructed by:

$$\tilde{n}_{sc}^{RA}(i) = \begin{cases} \left(\tilde{n}_{sc}^{RA}(0) + f(i/4)\right) \bmod N_{sc}^{RA} & i \bmod 4 = 0 \text{ and } i > 0 \\ \tilde{n}_{sc}^{RA}(i-2) + 6 & i \bmod 4 = 2 \text{ and } \tilde{n}_{sc}^{RA}(i-2) < 6 \\ \tilde{n}_{sc}^{RA}(i-2) - 6 & i \bmod 4 = 2 \text{ and } \tilde{n}_{sc}^{RA}(i-2) \geq 6 \end{cases}$$

where $\tilde{n}_{sc}^{RA}(i)$ is the frequency position of the i-th symbol group.

Embodiment 3

In this embodiment, certain symbol groups in the reference preambles may be disabled for a scenario of small TO and small RO. In FIG. 3, each of the preambles has both small hopping and large hopping between its contiguous symbol groups. When the TO and FO are both small, certain symbol groups shown in FIG. 3 may be disabled to keep only the large hopping.

Figure 5:
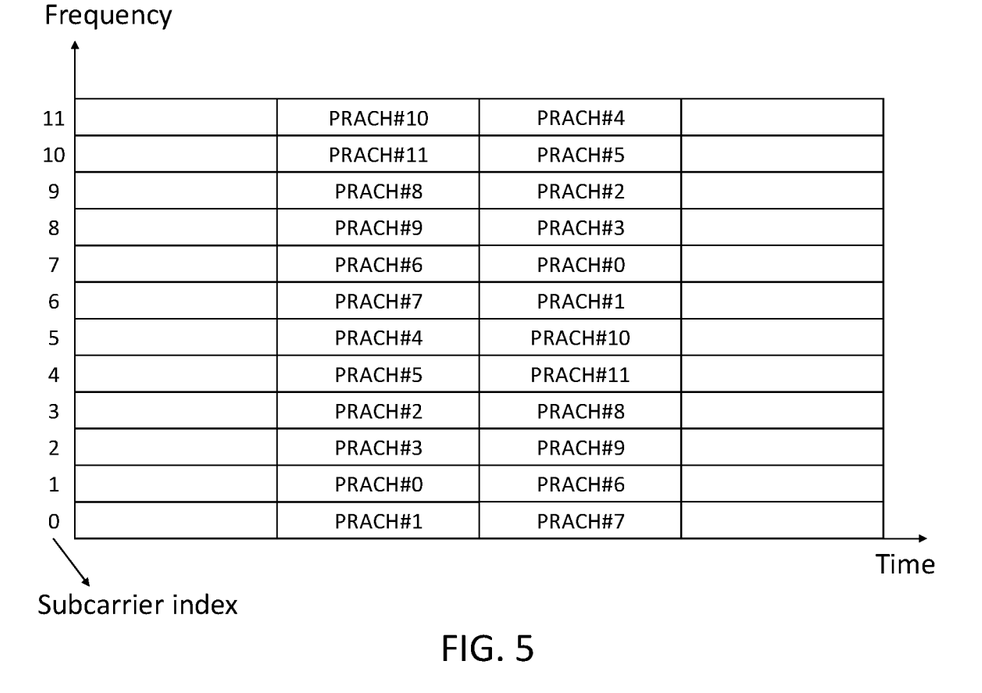
FIG. 5 shows a schematic diagram of preambles according to an embodiment of the present disclosure.

FIG. 5 shows a schematic diagram of preambles PRACH #1 to PRACH #11 according to an embodiment of the present disclosure. Compared to the symbol groups shown in FIG. 3, the 1st and 4th symbol groups in the repetition unit of each of PRACH #0 to PRACH #11 shown in FIG. 5 are disabled. Thus, each of PRACH #0 to PRACH #11 has only large frequency hopping between symbol groups in its repetition unit. As shown in FIG. 5, each of PRACH #0 to PRACH #11 only has the hopping of 6 SCSs. In an embodiment, the number of repetition units in each of PRACH #0 to PRACH #11 may be increased, e.g., when the link budget is considered.

In an embodiment, the empty time-frequency resources generated by disabling may be used for new ROs of additional PRACH preambles.

In an embodiment, the CP has the same length with the maximal residual TO.

In an embodiment, the pattern (e.g. the preambles) shown in FIG. 5 may be expressed by the formula of new hopping pattern disclosed in Embodiment 2, i.e.:

$$\tilde{n}_{sc}^{RA}(i) = \begin{cases} \left(\tilde{n}_{sc}^{RA}(0) + f(i/4)\right) \bmod N_{sc}^{RA} i \bmod 4 = 0 \text{ and } i > 0 \\ \tilde{n}_{sc}^{RA}(i-2) + 6i \bmod 4 = 2 \text{ and } \tilde{n}_{sc}^{RA}(i-2) < 6 \\ \tilde{n}_{sc}^{RA}(i-2) - 6i \bmod 4 = 2 \text{ and } \tilde{n}_{sc}^{RA}(i-2) \geq 6 \end{cases}$$

where $\tilde{n}_{sc}^{RA}(i)$ is the frequency position of the i-th symbol group.

Embodiment 4

In this embodiment, the SCS of the preambles is enlarged for compensating large FO.

In an embodiment, the SCS is enlarged up to twice the maximum (maximal) FO, to overcome the large FO.

Figure 6:
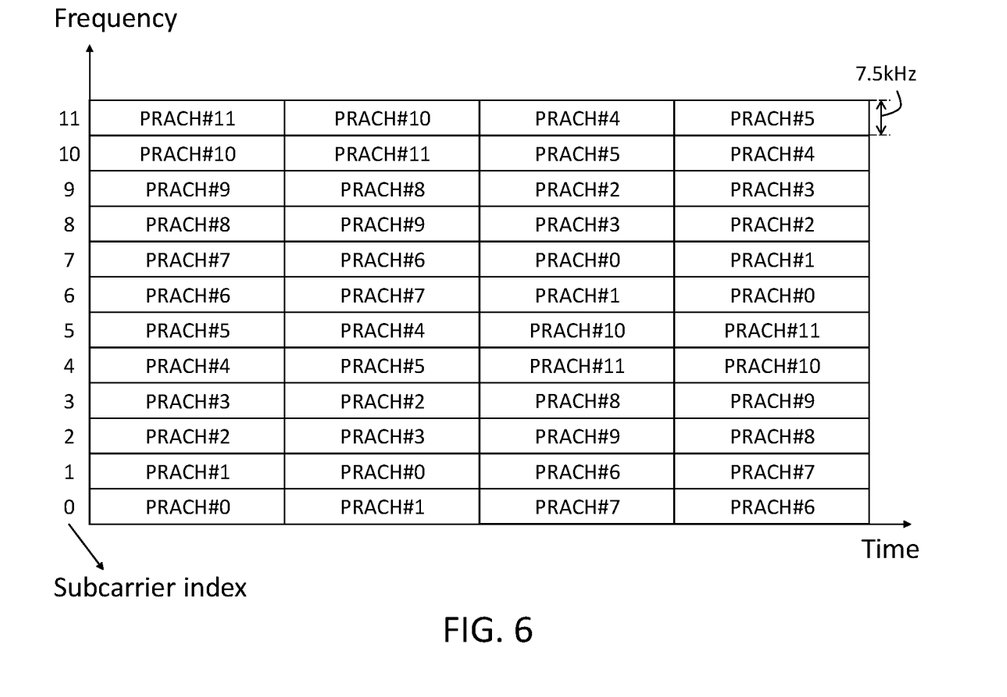
FIG. 6 shows a schematic diagram of preambles according to an embodiment of the present disclosure.

FIG. 6 shows a schematic diagram of preambles PRACH #0 to PRACH #11 according to an embodiment of the present disclosure. In FIG. 6, the FO is larger than half of original SCS (i.e. 0.5*SCS) and a carrier-to-noise ratio (CNR) is sufficient to support the SCS of twice the maximum FO (2*FO). In such a condition, the SCS may be adjusted to 7.5 KHz which is twice the maximum FO (i.e. the maximum FO is 3.75 KHz).

Embodiment 5

In this embodiment, the BS may configure at least one scaling factor for adjusting the SCS of the predetermined preambles.

In an embodiment, the residual FO has various values after the UE compensates based on the positioning results of the GNSS. In this embodiment, the BS may configure the scaling factor(s) for adjusting (e.g. determining) the SCS of the PRACH preambles. In addition, the BS may configure different scaling factors for different radio frames. For example, the BS may configure a list of scaling factors and the scaling factors are corresponding to contiguous radio frames in a sequence of the list of scaling factors. In this embodiment, the UE is able to choose the ROs in different radio frames (i.e. different scaling factors) according to its own (coarse) FO estimation.

Figure 7:
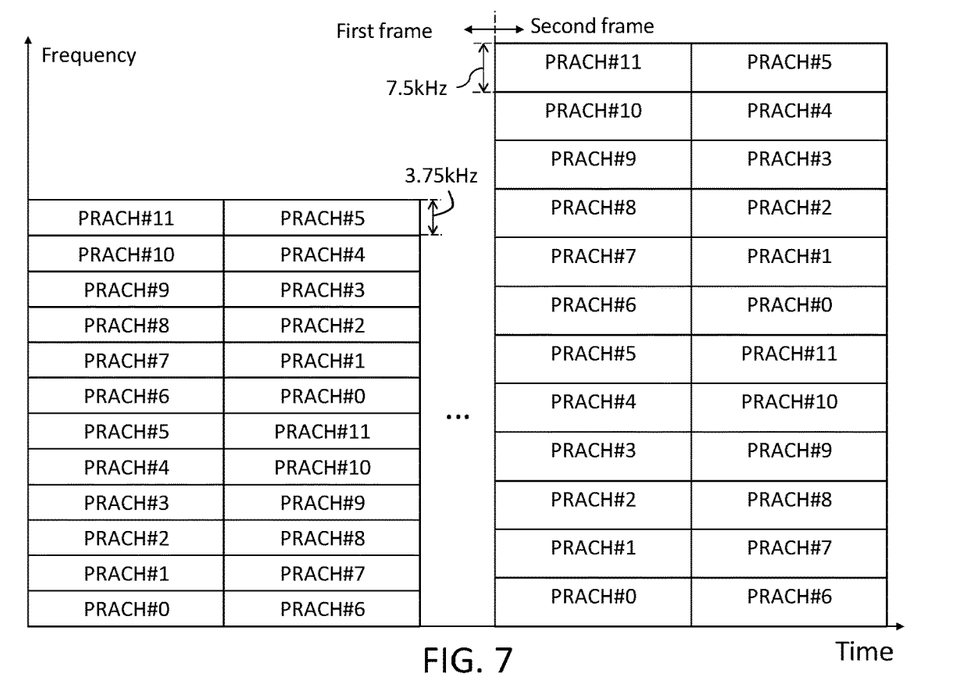
FIG. 7 shows a schematic diagram of preambles according to an embodiment of the present disclosure.

FIG. 7 shows a schematic diagram of preambles PRACH #0 to PRACH #11 according to an embodiment of the present disclosure. In FIG. 7, the BS configures two scaling factors with values 1 and 2 and broadcasts the scaling factors to the UEs in the system information block (SIB). After receiving the scaling factors, the UE applies the scaling factors to different frames. As shown in FIG. 7, the SCS for each of PRACH #0 to PRACH #11 is 3.75 KHz (e.g. the scaling factor with the value 1 is applied) in a first frame. After the first frame, the SCS for each of PRACH #0 to PRACH #11 becomes 7.5 KHz (e.g. the scaling factor with the value 2 is applied) in a second frame. Note that the first frame and the second frame may be repeated in the time domain and the UE may estimate its own FO and choose an appropriate frame to send the PRACH preamble.

Embodiment 6

In this embodiment, the number of symbols in a single symbol group is reduced, e.g., for a situation of small TO. In an embodiment, the symbol group is the concatenation of N OFDM symbols, where N is a positive integer. When N is large, the overhead caused by the CP is relatively alleviated. In an embodiment with the small TO, the CP may be designed to have a short length and N may be also configured to be a small number. In an embodiment of N reduced to be a small number, the channel coefficients of the symbol groups may remain the same, to reduce the estimation error of the TO.

Figure 8:
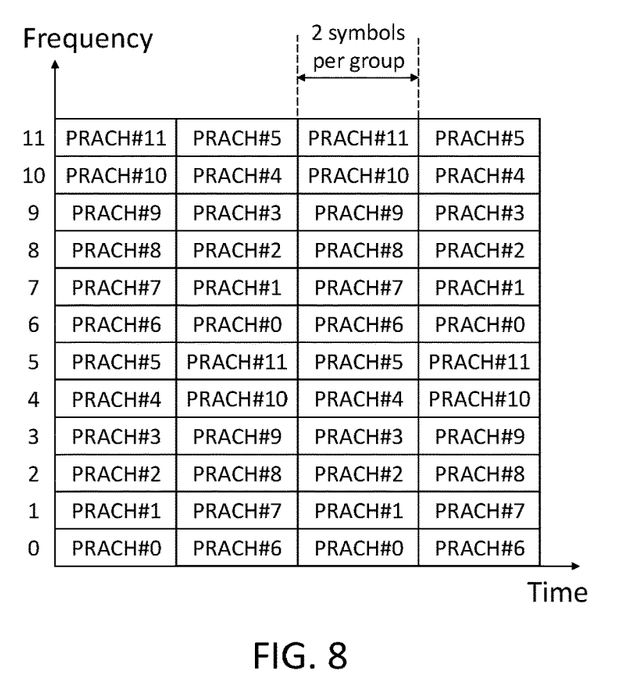
FIG. 8 shows a schematic diagram of preambles according to an embodiment of the present disclosure.

FIG. 8 shows a schematic diagram of preambles PRACH #0 to PRACH #11 according to an embodiment of the present disclosure. In FIG. 8, the number N of symbols in each symbol group is reduced to 2.

Embodiment 7

In this embodiment, the RO gaps are inserted between the symbol groups of the PRACH preambles, e.g., when the FO is large. As a result, the effect caused by the FO may be eliminated.

Figure 9:
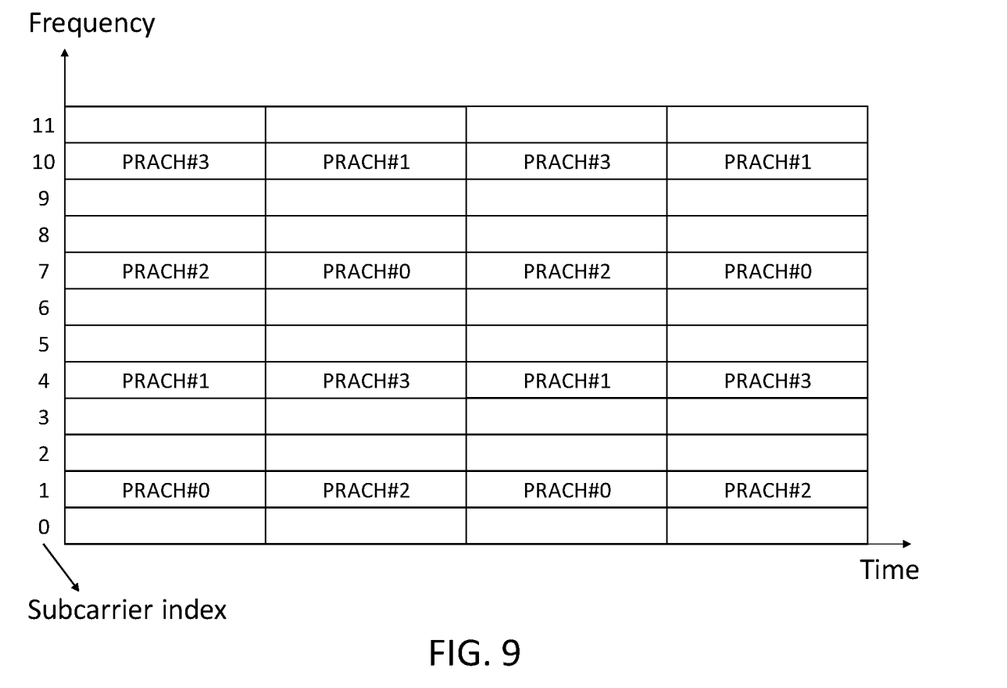
FIG. 9 shows a schematic diagram of preambles according to an embodiment of the present disclosure.

FIG. 9 shows a schematic diagram of preambles PRACH #0 to PRACH #3 according to an embodiment of the present disclosure. In this embodiment, the maximum FO is 5 KHz and the SCS is 3.5 KHz. In FIG. 9, the ROs with SCS indexes 0, 2, 3, 5, 6, 8, 9 and 11 are disabled. In other words, the RO gaps with 2 SCSs are inserted between every two symbol groups contiguous in frequency domain. In this embodiment, the BS detects 3 subcarriers for single RO of each symbol group (i.e. the RO for each symbol group in FIG. 9 comprises 3 subcarriers). Because the maximum FO is smaller than 1.5 times of the SCS, the effect of the FO may be eliminated by the preamble configuration/format shown in FIG. 9.

Embodiment 8

In this embodiment, the symbols of preamble group for each preamble may set to different values, to form a sequence (e.g. ZC sequences or PN sequences).

In an embodiment, when the maximal FO is significantly large, the number of ROs for the preambles may be reduced because the SCS may be greatly increased for compensating the FO. In this embodiment, the symbols of each symbol group may form a ZC sequence or a PN sequence, to increase PRACH preamble capacity.

Figure 10:
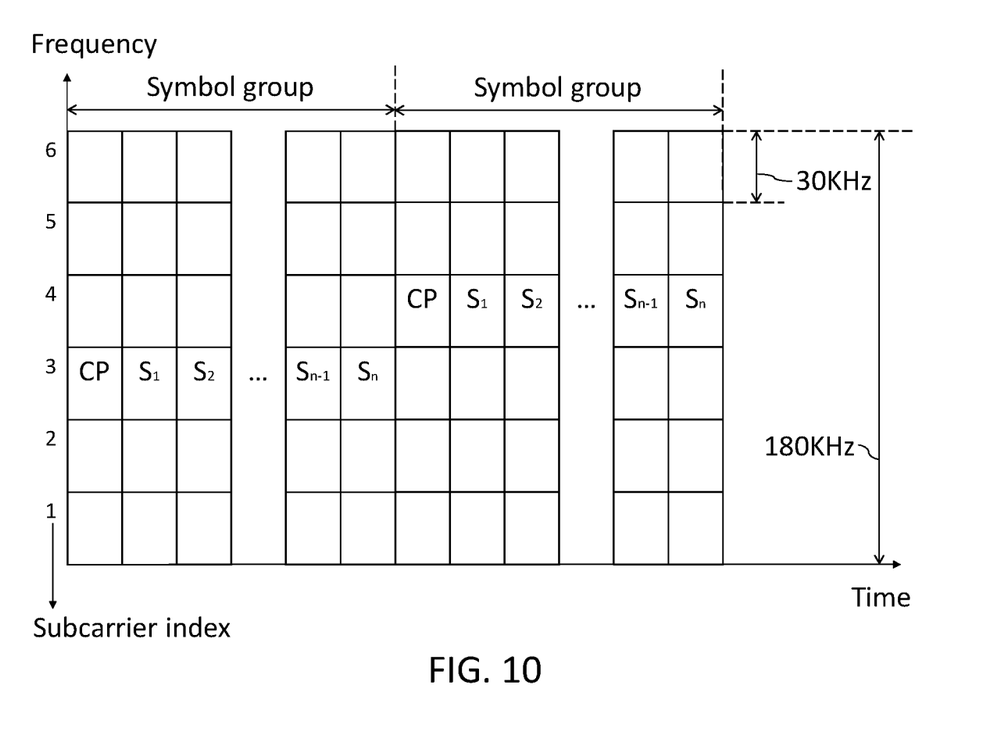
FIG. 10 shows a schematic diagram of preambles according to an embodiment of the present disclosure.

FIG. 10 shows a schematic diagram of preambles according to an embodiment of the present disclosure. In this embodiment, the maximal FO is 60 KHz and the SCS is set to 30 KHz to alleviate the effects of the FO. In FIG. 10, each symbol group has a CP and symbols S1 to SN, where N is a positive integer greater than 1. Note that only 2 symbol groups are shown with the CP and the symbols S1 to SN for illustrations in FIG. 10. In this embodiment, the symbols S1 to SN in each of symbol groups may set to different values (e.g. to form ZC sequence or PN sequence). With different choices of the symbols S1 to SN, each RO is able to support simultaneous transmissions of more than one preamble. Therefore, the collisions in the PRACH procedure is largely reduced.

Embodiment 9

In this embodiment, the RO gaps with different numbers of SCSs are inserted between the symbol groups for the preambles.

In an embodiment, the UEs within a beam may have different FOs. Therefore, the RO gaps between ROs can be set to have different numbers of SCSs. In an embodiment, the UE determines a coarse estimation for its FO and accordingly chooses an appropriate RO based on the RO gaps of the RO.

Figure 11:
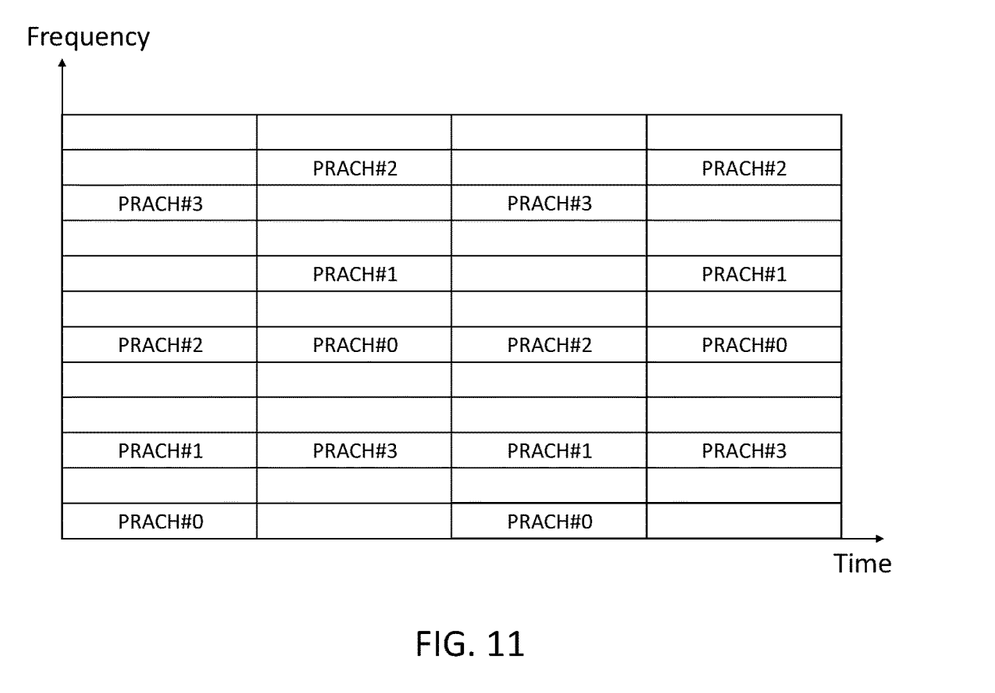
FIG. 11 shows a schematic diagram of preambles according to an embodiment of the present disclosure.

FIG. 11 shows a schematic diagram of preambles PRACH #0 to PRACH #3 according to an embodiment of the present disclosure. In FIG. 11, the four ROs located at the same time respectively for the PRACH #0 to PRACH #3 are separated by gaps with different numbers of SCSs. For example, in the 1st symbol group of the PRACH #0 to PRACH #3, the gap between the ROs for PRACH #0 and PRACH #1 is 1, the gap between the ROs for PRACH #1 and PRACH #2 is 2 and the gap between the ROs for PRACH #2 and PRACH #3 is 3. Therefore, the ROs for the RACH #0 to PRACH #3 can support maximal FO of 2.5, 1.5, 1.5, 0.5 times of SCS, respectively.

In an embodiment, the gap between the ROs shown in FIG. 11 may be reduced for comprising more ROs.

Embodiment 10

In this embodiment, the SCS may be shrank, e.g., for the situation with large TO and small FO.

In an embodiment, the FO may be smaller than 0.5/maximum TO. In this embodiment, the TO may be overcome by adjusting (e.g. selecting) the SCS which is larger than 2*maximum FO and/or smaller than 1/maximum TO.

Figure 12:
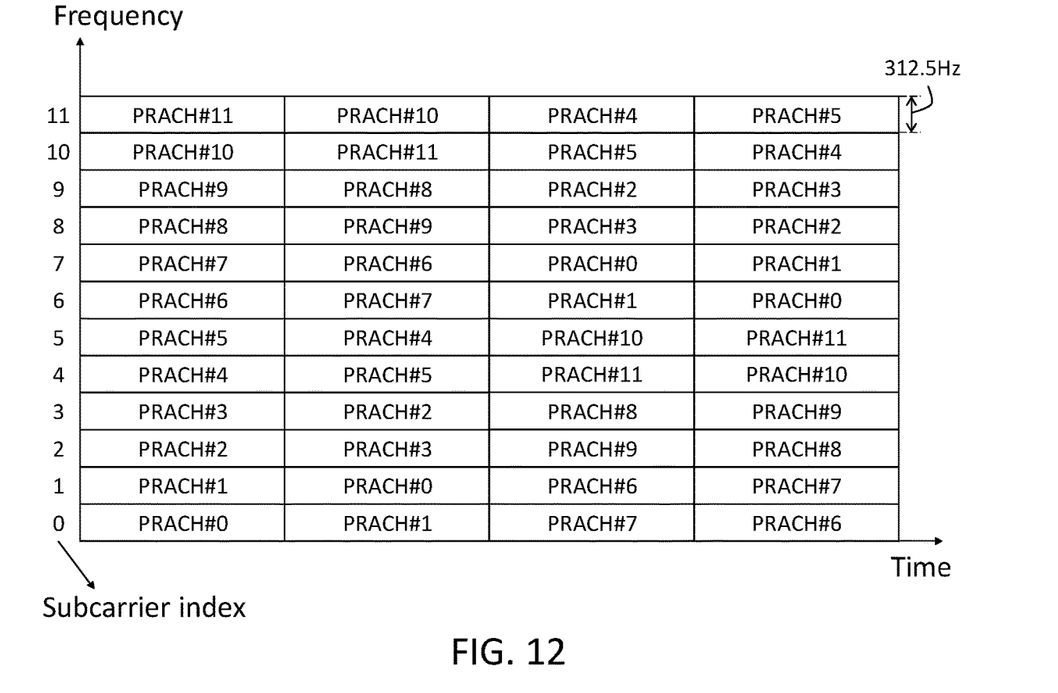
FIG. 12 shows a schematic diagram of preambles according to an embodiment of the present disclosure.

FIG. 12 shows a schematic diagram of preambles PRACH #0 to PRACH #11 according to an embodiment of the present disclosure. In this embodiment, the maximum TO is 3 ms and the maximum FO is 100 Hz. In such a condition, the SCS is set to 312.5 Hz for compensating the TO and the FO.

Embodiment 11

In an embodiment, the CP may be extended, e.g., for the scenario with large TO.

In an embodiment, the length of single symbol group may be greater than the maximum TO and symbols in each of the symbol groups have different values (e.g. form a sequence). In this embodiment, the CP may be extended to estimate the TO.

Figure 13:
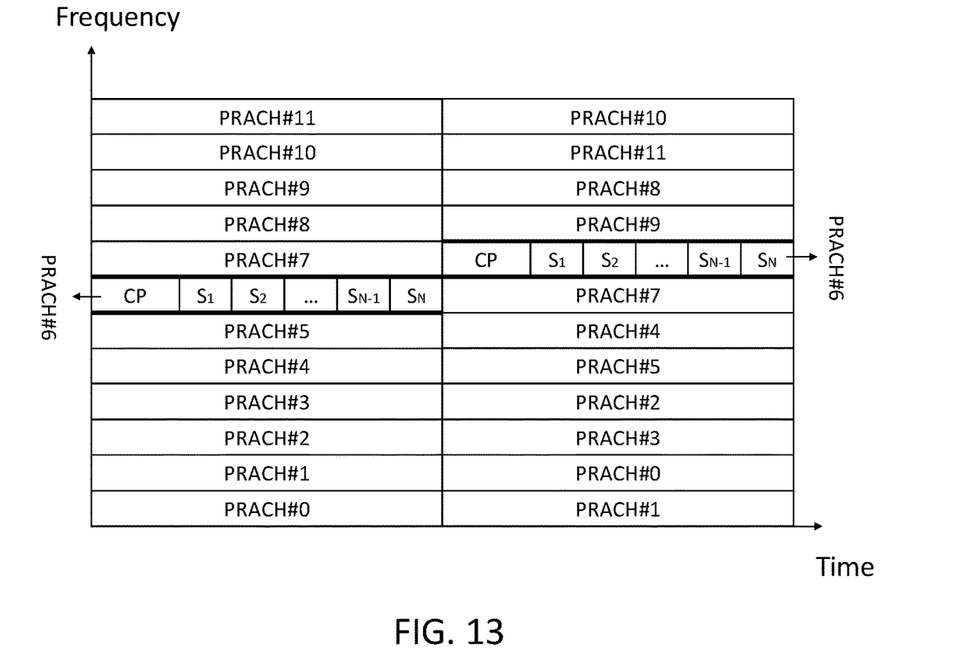
FIG. 13 shows a schematic diagram of preambles according to an embodiment of the present disclosure.

FIG. 13 shows a schematic diagram of preambles PRACH #0 to PRACH #11 according to an embodiment of the present disclosure, wherein the SCS is 3.75 KHz. In FIG. 13, each preamble group consists of a CP and N symbols S1 to SN. In this embodiment, the CP is extended by comprising M symbols in the tail of its symbol group, wherein M is a positive integer smaller than N. For example, M may be 12 and the extended CP comprises the CP and the symbols SN-11, SN-10, . . . SN (N>12). Based on the extended CP with 12 added symbols, the BS is able to estimate the TO up to 3.2 ms.

Embodiment 12

In this embodiment of large TO and large FO, the symbols in each symbol group may have different values (e.g. form a sequence) and/or the RO gaps may be inserted between symbol groups for different preambles. In other words, the Embodiments 7 and 11 may be combined.

Figure 14:
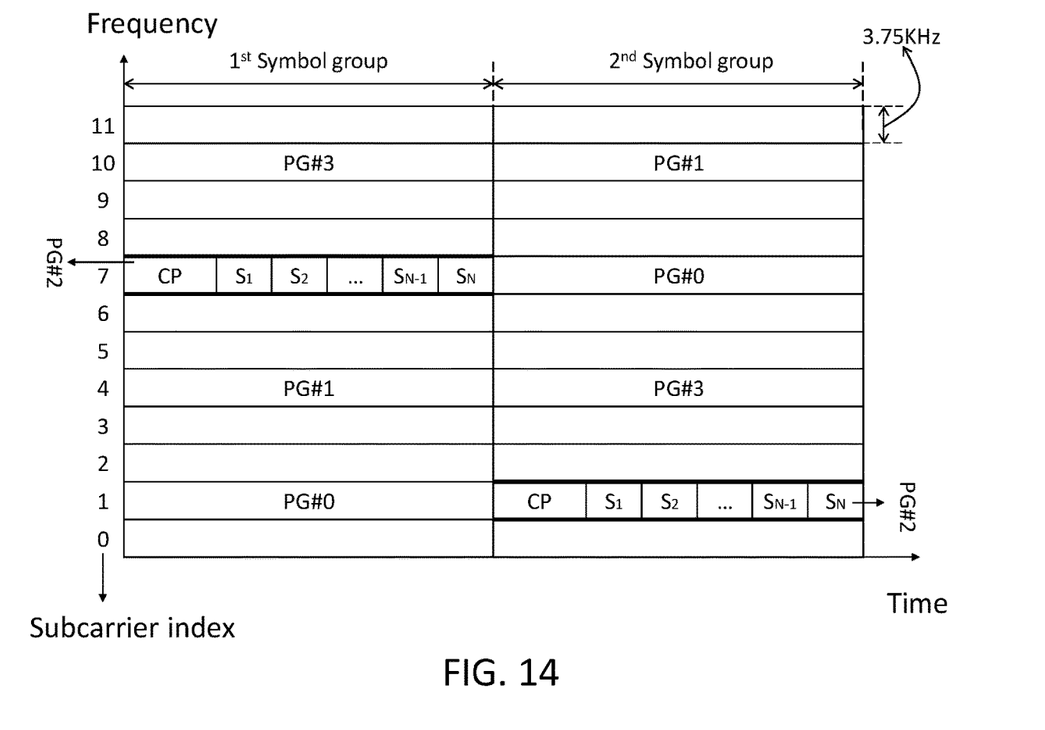
FIG. 14 shows a schematic diagram of preambles according to an embodiment of the present disclosure.

FIG. 14 shows a schematic diagram of preambles according to an embodiment of the present disclosure, wherein the SCS is 3.75 KHz. In FIG. 14, the ROs in subcarriers with the indexes 0, 2, 3, 5, 6, 8, 9 and 11 are disabled. In addition, each symbol group comprises a CP and N symbols S1 to SN and the symbols S1 to SN form a sequence (e.g. ZC sequence or PN sequence). Therefore, each enabled subcarrier (e.g. RO) is able to comprise multiple symbol groups for multiple preambles (e.g. a preamble group). For example, 1st symbol group in the subcarrier #1 may be corresponding to a preamble group PG #0, 1st symbol group in the subcarrier #4 may be corresponding to a preamble group PG #1, and so on. In FIG. 14, each preamble in preamble groups PG #0 to PG #3 has the hopping larger than 1 SCS (i.e. 6 SCSs) from the 1st symbol group to 2nd symbol group. In an embodiment, the hopping for each preamble in preamble groups PG #0 to PG #3 may change to be 1 SCS.

Figure 15:
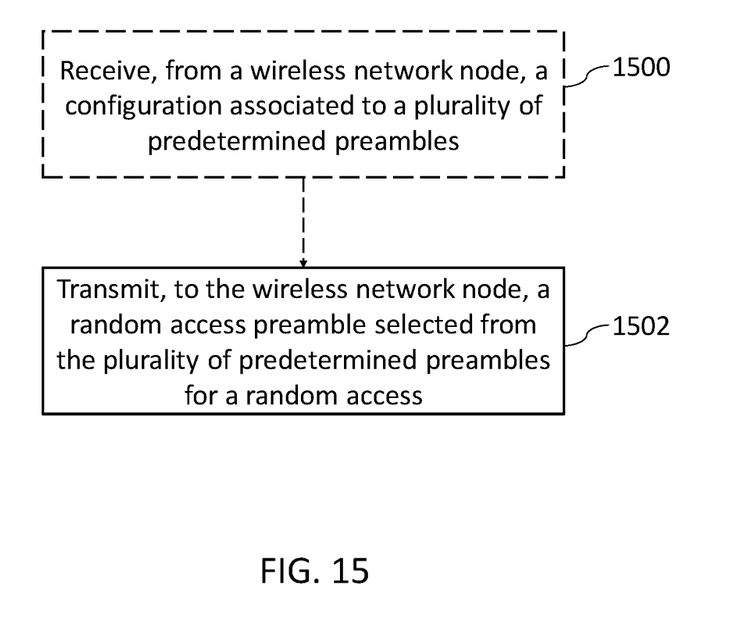
FIG. 15 shows a flowchart of a process according to an embodiment of the present disclosure.

FIG. 15 shows a flowchart of a process according to an embodiment of the present disclosure. The process shown in FIG. 15 may be utilized in a wireless terminal (e.g. UE) and comprises the following step(s):

Step 1500: Receive, from a wireless network node (e.g. BS), a configuration associated to a plurality of predetermined preambles (Optional).

Step 1502: Transmit, to the wireless network node, a random access preamble selected from the plurality of predetermined preambles for a random access.

In FIG. 15, the wireless terminal may receive a configuration associated to a plurality of predetermined preambles from a wireless network node (step 1500) (Optional). In addition, the wireless terminal transmits a random access preamble for a random access (procedure) to the wireless network node, wherein the random access preamble is selected from a plurality of predetermined preambles (step 1502).

More specifically, the plurality of predetermined preambles is determined by disabling at least one symbol group of a plurality of reference preambles in an embodiment.

In an embodiment, the plurality of predetermined preambles has a hopping between symbol groups for each of the plurality of predetermined preambles and the hopping is greater than 1 subcarrier spacing.

In an embodiment, the hopping is 6 subcarrier spacings.

In an embodiment, a length of a cyclic prefix in the plurality of predetermined preambles is adjusted based on the maximum time offset related to the wireless terminal.

In an embodiment, a subcarrier spacing of the plurality of predetermined preambles is greater than twice the maximum frequency offset.

In an embodiment, a subcarrier spacing of the plurality of predetermined preambles is smaller than a reciprocal of the maximum time offset.

In an embodiment, a subcarrier spacing of the plurality of predetermined preambles is adjusted by at least one scaling factor.

In an embodiment, the subcarrier spacing of the plurality of predetermined preambles is adjusted by different scaling factors in different frames.

In an embodiment, the plurality of predetermined preambles is determined by disabling at least one resource occasion in a plurality of reference preambles.

In an embodiment, the plurality of predetermined preambles has resource occasion gaps between every two symbol groups contiguous in frequency domain.

In an embodiment, the resource occasion gaps have different numbers of subcarrier spacings.

In an embodiment, symbols in each symbol group for the plurality of predetermined preambles form one of a Zadoff-Chu sequence or a pseudo-noise sequence.

In an embodiment, a cyclic prefix in the plurality of predetermined preambles comprises at least one symbol in a tail of a symbol group of the cyclic prefix.

In an embodiment of receiving the configuration associated to the plurality of predetermined preambles from the wireless network node, the configuration comprises at least one of disabling information for disabling at least one symbol group or at least one resource occasion of a plurality of reference preambles, a subcarrier spacing of the plurality of predetermined preambles, at least one scaling factor for adjusting the subcarrier spacing of the plurality of predetermined preambles, or a sequence of the at least one scaling factor.

Figure 16:
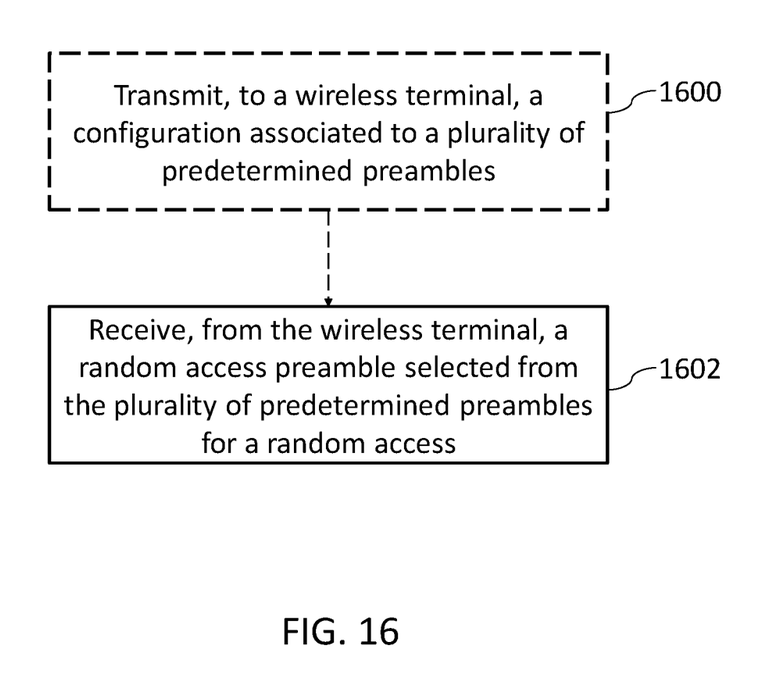
FIG. 16 shows a flowchart of a process according to an embodiment of the present disclosure.

FIG. 16 shows a flowchart of a process according to an embodiment of the present disclosure. The process shown in FIG. 16 may be utilized in a wireless network node (e.g. BS) and comprise the following step(s):

Step 1600: Transmit, to a wireless terminal (e.g. UE), a configuration associated to a plurality of predetermined preambles (Optional).

Step 1602: Receive, from the wireless terminal, a random access preamble selected from the plurality of predetermined preambles for a random access.

In FIG. 16, the wireless network node may transmit a configuration associated to a plurality of predetermined preambles to a wireless terminal (step 1600) (Optional). In addition, the wireless network node may receive a random access preamble for a random access (procedure) from the wireless terminal, wherein the random access preamble is selected from a plurality of predetermined preambles (step 1602).

More specifically, the plurality of predetermined preambles is determined by disabling at least one symbol group of a plurality of reference preambles in an embodiment.

In an embodiment, the plurality of predetermined preambles has a hopping between symbol groups for each of the plurality of predetermined preambles and the hopping is greater than 1 subcarrier spacing.

In an embodiment, the hopping is 6 subcarrier spacings.

In an embodiment, a length of a cyclic prefix in the plurality of predetermined preambles is adjusted based on the maximum time offset related to the wireless terminal.

In an embodiment, a subcarrier spacing of the plurality of predetermined preambles is greater than twice the maximum frequency offset.

In an embodiment, a subcarrier spacing of the plurality of predetermined preambles is smaller than a reciprocal of the maximum time offset.

In an embodiment, a subcarrier spacing of the plurality of predetermined preambles is adjusted by at least one scaling factor.

In an embodiment, the subcarrier spacing of the plurality of predetermined preambles is adjusted by different scaling factors in different frames.

In an embodiment, the plurality of predetermined preambles is determined by disabling at least one resource occasion in a plurality of reference preambles.

In an embodiment, the plurality of predetermined preambles has resource occasion gaps between every two symbol groups contiguous in frequency domain.

In an embodiment, the resource occasion gaps have different numbers of subcarrier spacings.

In an embodiment, symbols in each symbol group for the plurality of predetermined preambles form one of a Zadoff-Chu sequence or a pseudo-noise sequence.

In an embodiment, a cyclic prefix in the plurality of predetermined preambles comprises at least one symbol in a tail of a symbol group of the cyclic prefix.

In an embodiment of transmitting the configuration associated to the plurality of predetermined preambles to the wireless terminal, the configuration comprises at least one of disabling information for disabling at least one symbol group or at least one resource occasion of a plurality of reference preambles, a subcarrier spacing of the plurality of predetermined preambles, at least one scaling factor for adjusting the subcarrier spacing of the plurality of predetermined preambles, or a sequence of the at least one scaling factor.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
    transmitting, to a wireless network node, a random access preamble selected from a plurality of predetermined preambles for a random access; and
    receiving, from the wireless network node, a configuration associated to the plurality of predetermined preambles, wherein the configuration comprises disabling information for disabling at least one symbol group or at least one resource occasion of a plurality of reference preambles,
    wherein the plurality of predetermined preambles is determined by disabling at least one symbol group of a plurality of reference preambles, wherein the plurality of predetermined preambles has a hopping between symbol groups for each of the plurality of predetermined preambles and the hopping is greater than 1 subcarrier spacing, and wherein the hopping is 6 subcarrier spacings.

2. The wireless communication method of claim 1, wherein a length of a cyclic prefix in the plurality of predetermined preambles is adjusted based on a maximum time offset related to the wireless terminal, wherein a subcarrier spacing of the plurality of predetermined preambles is greater than twice the maximum frequency offset, wherein a subcarrier spacing of the plurality of predetermined preambles is smaller than a reciprocal of the maximum time offset, wherein a subcarrier spacing of the plurality of predetermined preambles is adjusted by at least one scaling factor, and wherein the subcarrier spacing of the plurality of predetermined preambles is adjusted by different scaling factors in different frames.

3. The wireless communication method of claim 1, wherein the plurality of predetermined preambles is determined by disabling the at least one resource occasion in the plurality of reference preambles, wherein the plurality of predetermined preambles has resource occasion gaps between every two symbol groups contiguous in frequency domain, and wherein the resource occasion gaps have different numbers of subcarrier spacings.

4. The wireless communication method of claim 1, wherein symbols in each symbol group for the plurality of predetermined preambles form one of a Zadoff-Chu sequence or a pseudo-noise sequence, wherein a cyclic prefix in the plurality of predetermined preambles comprises at least one symbol in a tail of a symbol group of the cyclic prefix.

5. The wireless communication method of claim 1, further comprising:
    receiving, from the wireless network node, a subcarrier spacing of the plurality of predetermined preambles, at least one scaling factor for adjusting the subcarrier spacing of the plurality of predetermined preambles, or a sequence of the at least one scaling factor.

6. A wireless communication method for use in a wireless network node, the wireless communication method comprising:

receiving, from a wireless terminal, a random access preamble selected from a plurality of predetermined preambles for a random access; and transmitting, to the wireless terminal, a configuration associated to the plurality of predetermined preambles, wherein the configuration comprises disabling information for disabling at least one symbol group or at least one resource occasion of a plurality of reference preambles, wherein the plurality of predetermined preambles is determined by disabling at least one symbol group of a plurality of reference preambles, wherein the plurality of predetermined preambles has a hopping between symbol groups for each of the plurality of predetermined preambles and the hopping is greater than 1 subcarrier spacing, and wherein the hopping is 6 subcarrier spacings.

7. The wireless communication method of claim 6, wherein a length of a cyclic prefix in the plurality of predetermined preambles is adjusted based on the maximum time offset related to the wireless terminal, wherein a subcarrier spacing of the plurality of predetermined preambles is greater than twice the maximum frequency offset, wherein a subcarrier spacing of the plurality of predetermined preambles is smaller than a reciprocal of the maximum time offset, wherein a subcarrier spacing of the plurality of predetermined preambles is adjusted by at least one scaling factor, and wherein the subcarrier spacing of the plurality of predetermined preambles is adjusted by different scaling factors in different frames.

8. The wireless communication method of claim 6, wherein the plurality of predetermined preambles is acquired by disabling the at least one resource occasion in the plurality of reference preambles, wherein the plurality of predetermined preambles has resource occasion gaps between every two symbol groups contiguous in frequency domain, and wherein the resource occasion gaps have different numbers of subcarrier spacings.

9. The wireless communication method of claim 6, wherein symbols in each symbol group for the plurality of predetermined preambles form one of a Zadoff-Chu sequence or a pseudo-noise sequence, wherein a cyclic prefix in the plurality of predetermined preambles comprises at least one symbol in a tail of a symbol group of the cyclic prefix, further wherein the method further comprising:

transmitting, to the wireless terminal, a subcarrier spacing of the plurality of predetermined preambles, at least one scaling factor for adjusting the subcarrier spacing of the plurality of predetermined preambles, or a sequence of the at least one scaling factor.

10. A wireless terminal, comprising:

a transceiver, configured to:

transmit, to a wireless network node, a random access preamble selected from a plurality of predetermined preambles for a random access; and receive, from the wireless network node, a configuration associated to the plurality of predetermined preambles, wherein the configuration comprises disabling information for disabling at least one symbol group or at least one resource occasion of a plurality of reference preambles; and a processor configured to determine the plurality of predetermined preambles by disabling at least one symbol group of a plurality of reference preambles, wherein the plurality of predetermined preambles has a hopping between symbol groups for each of the plurality of predetermined preambles and the hopping is greater than 1 subcarrier spacing, and wherein the hopping is 6 subcarrier spacings.

11. The wireless terminal of claim 10, wherein the processor is further configured to adjust a length of a cyclic prefix in the plurality of predetermined preambles based on the maximum time offset related to the wireless terminal, wherein a subcarrier spacing of the plurality of predetermined preambles is greater than twice the maximum frequency offset, wherein a subcarrier spacing of the plurality of predetermined preambles is smaller than a reciprocal of the maximum time offset, wherein the processor is further configured to adjust a subcarrier spacing of the plurality of predetermined preambles by at least one scaling factor, and wherein the processor is further configured to adjust the subcarrier spacing of the plurality of predetermined preambles by different scaling factors in different frames.

12. The wireless terminal of claim 10, wherein the processor is further configured to determine the plurality of predetermined preambles by disabling the at least one resource occasion in the plurality of reference preambles, wherein the plurality of predetermined preambles has resource occasion gaps between every two symbol groups contiguous in frequency domain, and wherein the resource occasion gaps have different numbers of subcarrier spacings.

13. The wireless terminal of claim 10, wherein symbols in each symbol group for the plurality of predetermined preambles form one of a Zadoff-Chu sequence or a pseudo-noise sequence, wherein a cyclic prefix in the plurality of predetermined preambles comprises at least one symbol in a tail of a symbol group of the cyclic prefix.

* * * * *